United States Patent [19]

Bredereck et al.

[11] Patent Number: 4,491,661
[45] Date of Patent: Jan. 1, 1985

[54] PROCESS FOR THE PREPARATION OF CELLULOSE ETHERS FROM AMMONIA-ACTIVATED CELLULOSE

[75] Inventors: Karl Bredereck; Emy Togelang, both of Stuttgart, Fed. Rep. of Germany

[73] Assignee: Hoechst Aktiengesellschaft, Frankfurt am Main, Fed. Rep. of Germany

[21] Appl. No.: 546,044

[22] Filed: Oct. 27, 1983

[30] Foreign Application Priority Data

Nov. 11, 1982 [DE] Fed. Rep. of Germany ....... 3241720

[51] Int. Cl.$^3$ ...................... C08B 11/02; C08B 11/08; C08B 11/12
[52] U.S. Cl. ........................ 536/84; 536/95; 536/96; 536/98; 536/100; 536/101
[58] Field of Search ............. 536/101, 84, 95, 96, 536/100, 98

[56] References Cited

U.S. PATENT DOCUMENTS

| | | | |
|---|---|---|---|
| 1,682,294 | 8/1928 | Lilienfeld | 536/98 |
| 2,110,526 | 3/1938 | Lorand | 536/100 |
| 2,145,273 | 1/1938 | Peterson et al. | 536/100 |
| 2,157,083 | 1/1938 | Peterson | 536/90 |
| 2,290,888 | 7/1942 | Miller et al. | 536/84 |
| 2,294,924 | 9/1942 | Miller et al. | 536/101 |
| 2,294,925 | 3/1942 | Miller | 536/56 |
| 2,296,829 | 9/1942 | Barry | 536/101 |
| 2,308,692 | 1/1943 | Freeman et al. | 536/98 |
| 2,671,780 | 3/1954 | Gaver et al. | 536/84 |
| 2,729,535 | 1/1956 | Balassa et al. | 536/98 |
| 3,069,409 | 12/1962 | Henry et al. | 536/98 |

FOREIGN PATENT DOCUMENTS 546633 9/1957 Canada ......................... 536/101
463056 4/1937 United Kingdom .

OTHER PUBLICATIONS

Chemical Abstracts vol. 96, (1982), Jun., No. 26, Abstract 96:219564C.
USSR Inventor's Certificate Specification No. 907004–Fld. Jun. 2, 1980.

Primary Examiner—Ronald W. Griffin
Attorney, Agent, or Firm—Schwartz, Jeffery, Schwaab, Mack, Blumenthal & Koch

[57] ABSTRACT

A process is disclosed for the preparation of water-soluble cellulose ethers, comprising the steps of activating cellulose with ammonia, alkalizing the activated cellulose, and etherifying the alkali cellulose. In the process, the activated cellulose is alkalized in the presence of ammonia and, optionally, in the presence of an organic solvent, and the ammonia is removed from the alkali cellulose in the presence of the alkalizing agent and, optionally, the organic solvent. Etherification proceeds in a medium which contains at least portions of said organic solvent. The organic solvent comprises, in particular, an alkanol which has from 1 to 6 carbon atoms. For the etherification step, carboxymethylation or hydroxyethylation is preferred.

15 Claims, No Drawings

PROCESS FOR THE PREPARATION OF CELLULOSE ETHERS FROM AMMONIA-ACTIVATED CELLULOSE

BACKGROUND OF THE INVENTION

The present invention relates to a process for preparation of water-soluble cellulose ethers, by alkalization and etherification of cellulose which has been activated with ammonia.

The preparation of cellulose ethers having uniform or different types of ether substituents is known (see, for example, "Ullmanns Encyklopaedie der technischen Chemie" [Ullmann's Encyclopedia of Industrial Chemistry], Volume 9, keyword "cellulose ethers", Verlag Chemie-Weinheim, 4th edition 1975, pages 192 et seq.), these being prepared, in general, either by (a) the principle of Williamson's ether synthesis, that is, by reacting cellulose with alkyl or aralkyl halides (with the consumption of a base) and/or by (b) as shown below, or by (c) reacting cellulose with activated reactants (in the presence of catalytic quantities of a base):

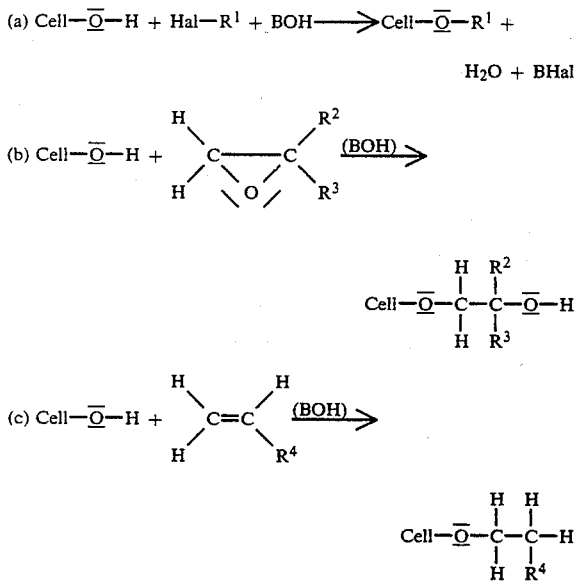

In these general equations:

Cell-$\overline{O}$-H denotes, on the cellulose molecule, a hydroxyl group which is to be etherified, Hal denotes chlorine or bromine, $R^1$ denotes an alkyl radical from $C_1$ to $C_{15}$, an aralkyl radical from $C_7$ to $C_{15}$, a carboxyalkyl radical from $C_1$ to $C_3$, a sulfonoalkyl radical from $C_1$ to $C_3$, a phosphonoalkyl radical from $C_1$ to $C_3$, a hydroxyalkyl radical from $C_1$ to $C_6$ or an N,N-dialkylaminoalkyl radical in which each alkyl group is from $C_1$ to $C_3$, $R^2$, $R^3$ denote hydrogen or an alkyl radical from $C_1$ to $C_{13}$, $R^2$ being identical with $R^3$ or different therefrom, BOH denotes a base, such as NaOH or a quaternary ammonium base, and $R^4$ denotes an optionally N-substituted carboxamide or sulfonamide radical or a nitrile radical.

For preparing mixed ethers of cellulose, various etherifying agents are allowed to act simultaneously or sequentially on cellulose. For this purpose, reactions according to only one of the variants a to c indicated, but particularly reactions according to at least two of the variants are carried out. The following are examples of reaction products which can be prepared by variant (a): methyl cellulose (MC), benzyl cellulose (BC), carboxymethyl cellulose (CMC), sulfonoethyl cellulose (SEC), phosphonomethyl cellulose (PMC), or N,N-diethylaminoethyl cellulose (DEAEC). The following are examples of reaction products which can be prepared by variant (b): hydroxyethyl cellulose (HEC) or hydroxypropyl cellulose (HPC). The following are examples of reaction products which can be prepared by variant (c): sulfonoamidoethyl cellulose (SAEC) or cyanoethyl cellulose (CNEC). Mixed ethers of cellulose which can be prepared by the same variant(s) or different variant(s) of those indicated include, for example, methyl hydroxyethyl cellulose (MHEC), ethyl hydroxyethyl cellulose (EHEC), hydroxyethyl hydroxypropyl cellulose (HEHPC), methyl carboxymethyl cellulose (MCMC), hydroxyethyl phosphonomethyl cellulose (HEPMC), or methyl hydroxyethyl hydroxypropyl cellulose (MHEHPC). Within the scope of the statements below, the term "cellulose ethers" is to be understood as meaning both products having a unitary substituent, such as hydroxyethyl cellulose, and products having at least two different substituents, such as methyl carboxymethyl cellulose.

Most of the known processes for the preparation of cellulose ethers are carried out in two main steps:
1. The preparation of the "alkali cellulose".
2. The etherification of the cellulose molecule.

For preparing the "alkali cellulose", cellulose in a finely divided (for example, ground) form is mixed as homogeneously as possible in suitable technical equipment with water and alkali metal hydroxide (in general NaOH, but other bases, such as quaternary ammonium bases, are also possible). The alkali metal hydroxide is used in a solid form or in the form of an aqueous solution. For the etherification reaction itself, and thus for the quality of the end product of the reaction, the uniformity and intensity of the mixing is of decisive importance. Alkalization is generally effected at as low a temperature as possible, for example, room temperature or below, in order to suppress degradation of the polymer (the so-called "ripening"); however, under certain circumstances, for example, the subsequent preparation of low-viscosity cellulose ethers, this degradation may be desirable. An etherifying agent is optionally added as early as the alkalizing step, but in this case the temperature must generally be increased, in order to carry out the actual etherification reaction.

The actual etherifying step is generally run by heating the alkali cellulose produced in the first step, together with the etherifying agent which has previously been added, to temperatures between 30° and 120° C. It is also possible to remove, in advance, part of the water present in the first step. Vigorous mixing in the second step is also very important for the quality of the reaction product and for the cost-effiency of the process, since, for example, it is desirable to have a good yield in the substitution reaction, while employing as small a quantity as possible of the etherifying agent(s).

Both continuous and discontinuous procedures are known for the two reaction steps. In the case of particular reactants, it is also possible to combine the two steps in such a way that pre-alkalization of the cellulose does not take place. Dispersing auxiliaries (suspending agents) are optionally employed in both steps, or at least in one of the two steps, in order to achieve better mixing of the heterogeneous reaction mixture, and for this purpose organic solvents which are either soluble in water or more or less insoluble in water are known from the state of the art; the most frequently used solvents of this kind include isopropanol, tert-butanol, methyl ethyl ketone, or aromatic hydrocarbons, e.g., benzene or toluene.

The state of the art also describes processes for the preparation of water-soluble cellulose ethers, in which an ammonia-activated alkali is employed.

In the paper "The Effect of Activation by Ammonia on the Alkalization and Xanthation of Cellulose" by Schleicher et al., published in "Faserforschung and Textilechnik" ("Fiber Research and Textile Engineering") 24, 1973, number 9, pages 371 to 376, it is stated that after activation of cellulose with liquid ammonia or aqueous solutions of ammonia, conversion to alkali cellulose can be effected at lower NaOH concentrations, as compared with untreated cellulose. In general, activation proceeds at temperatures between 0° and $-50°$ C., for a duration of about 30 minutes; the activating agent is then removed at room temperature and after this, alkalization is initiated. Activation with liquid ammonia, followed by evaporation of the ammonia and drying at room temperature before carrying out the final reaction, is considered to be particularly favorable.

Activation of cellulose with solutions of ammonia in various organic solvents is described by Koura et al. in their paper "Investigations on the Swelling and Dissolution of Cellulose in Mixtures of Liquids Containing Amines", published in "Faserforschung und Textiltechnik" (Fiber Research and Textile Engineering") 24, 1973, number 2, pages 82 to 86. According to this paper, solutions of ammonia in solvents such as water, dimethylsulfoxide, formamide, monoethanolamine, or morpholine can be used to produce effects similar to those achieved with liquid ammonia; this does not apply, however, to solutions of ammonia in alcohols, for example, methanol or ethylene glycol, which do not cause a structural change of the cellulose. Esterification is the only chemical reaction which is carried out with the activated or non-activated celluloses.

The paper "Preparation of Alkali-Soluble Cyanoethyl Cellulose from Preactivated Native Cellulose", by Koura et al., published in "Faserforschung und Textiltechnik" ("Fiber Research and Textile Engineering") 28, 1977, number 2, pages 63 to 65, gives an account of the preparation of cellulose ethers (using cyanoethyl groups as the substituent) from cellulose which has been activated with liquid ammonia. Even at a low degree of substitution of 0.5 or less, the reaction products obtained in the process already have a good solubility in an aqueous NaOH solution. Prior to the etherification reaction, the ammonia is completely removed or washed out, respectively.

As is stated by Schleicher et al. in their paper "Influencing the Reactivity of Cellulose by Activation", published in "Das Papier" ("Paper"), 34th year, number 12, 1980, pages 550 to 555, pretreating with ammonia does not result in any changes or produces only slight changes in the initial velocity of reaction and in the degree of substitution attained, in the case of carboxymethylation and methylation. However, this statement is based on the assumption that there is a change in the distribution of substituents (increased uniformity).

In the paper "The Effect of Preactivation on the Carboxymethylation of Cellulose", by Dautzenberg et al., published in "Acta Polymerica", 31, 1980, number 10, pages 662 to 667, it is pointed out that preactivation of cellulose with $NH_3$ leads to an improved solubility of the NaCMC produced. Improved solubility is, in particular, observed, if etherification itself proceeds in a cellulose/NaOH/water system, which additionally contains an organic solvent, for example, ethanol. The effect achieved is attributed to a more uniform distribution of the substituent. In carrying out the reaction (a) liquid ammonia is caused to act at $-50°$ C., (b) the ammonia is evaporated, (c) the activated cellulose is alkalized and (d) the alkali cellulose is reacted with the etherifying agent.

According to German Democratic Republic Patent No. 146,462, a process for the preparation of water-soluble NaCMC having a low degree of substitution of 0.5 or less uses preactivated cellulose and includes the steps of (a) activation with liquid ammonia at $-50°$ C., (b) removal of the ammonia by evaporation, (c) alkalization in an $NaOH/H_2O$/ethanol system and (d) etherification. In the reaction product, the constituents which are insoluble in water are reduced to less than about 5%, compared with 12 to 18% in reaction products prepared from cellulose which has not been preactivated.

From German Democratic Republic Patent No. 148,342 it is known that preactivation of cellulose with liquid ammonia, in the preparation of NaCMC covering a DS (degree of substitution) range from 0.4 to 0.7, results in a viscosity increase by a factor from 2 to 5. The reaction process corresponds to that described in the above-mentioned GDR Pat. No. 146,462. The aqueous solutions which can be prepared from the NaCMC still contain relatively large amounts of insoluble constituents, ranging from about 4 to 15%.

SUMMARY OF THE INVENTION

It is the object of the present invention to provide a process for the preparation of water-soluble cellulose ethers, particularly cellulose ethers having a water-solubility of more than 93%, which yields products showing good solubility characteristics and having insoluble residues in proportions which are as small as possible.

In accomplishing this object, a process is provided comprising the steps of: (a) activating cellulose with ammonia; (b) alkalizing the activated cellulose with an alkalizing agent in the presence of ammonia; (c) removing the ammonia from the alkali cellulose in the presence of the alkalizing agent; and (d) etherifying the alkali cellulose with an etherifying agent in the presence of an organic solvent.

Additional objects, features, and advantages of the present invention will be apparent from the following description or preferred embodiments, which are given by way of illustration only.

DETAILED DESCRIPTION OF PREFERRED EMBODIMENTS

In the process of the present invention, alkalization of the activated cellulose is effected in the presence of ammonia and, optionally, an organic solvent, the ammonia is removed from the alkali cellulose in the presence of the alkalizing agent and, optionally, the organic solvent, and etherification is carried out in a medium which contains at least portions of the organic solvent.

For the activation of the cellulose, liquid ammonia is preferably used, particularly at a temperature below its boiling point ($BP_{760}$) of about $-33°$ C. Equipment for carrying out a process of this kind is known from cotton-finishing technology (e.g., ® Sanfor-Set Process)

and is adapted for recondensing and recycling the evaporating ammonia. In a preferred variant of the process according to the invention, the organic solvent used is present for at least part of the time during the removal of ammonia from the alkali cellulose and comprises, in particular, an alkanol having from 1 to 6 carbon atoms, for example, isopropanol or tert-butanol. It is, however, also possible to use other organic solvents, such as alkylene glycols or the monoethers and diethers thereof, tetrahydrofuran, dioxan, aromatic hydrocarbons, e.g., benzene or toluene, aliphatic ketones, e.g., acetone, or alkanes, e.g., n-heptane, as well as mixtures of these. The organic solvents are, in particular, employed in amounts from 1 to 50 parts by weight, per part by weight of cellulose.

All steps of the process according to the present invention can be carried out either discontinuously or continuously, using, for example, in the alkalizing and etherifying steps, equipment known from cellulose ether chemistry (for example, kneaders, agitator vessels, or impeller mixers). If the temperature level of the etherifying mixture is selected so that it is higher than the boiling point of the mixture of organic solvent and $H_2O$, it is advisable to carry out the process according to the invention in a pressure apparatus; it is also customary to carry out the reaction in a pressure apparatus if the reactants are already in a gaseous state under normal conditions (standard pressure and room temperature), for example, if ethylene oxide is used as the etherifying agent. The quantities of components indicated below reflect only the sum of the quantities of the components required for the reaction at the beginning of the etherifying step; at that time, part of the cellulose and the alkali metal hydroxide is already in the form of alkali cellulose, or when, for example, the etherifying agent is introduced into the reaction mixture in the form of acid (e.g., monochloroacetic acid for the preparation of NaCMC), additional quantities of base must be used for neutralization.

The cellulose employed is either of natural origin, for example, cotton linters or wood pulp, or it is a regenerated form, such as cellulose hydrate; the particle size of the cellulose before the beginning of the reaction should, as far as possible, be less than about 2.5 mm, in particular less than about 1 mm, it being possible to achieve this particle size, for example, by grinding cellulose which is supplied in a longer-fibered form into "powders."

Alkalization is, as a rule, carried out using an alkali metal hydroxide—usually NaOH, but also KOH or LiOH—in a solid form or in a dissolved form as an aqueous alkali metal hydroxide solution (for example, in the form of a 15 to 50% strength by weight solution). The amount of alkali metal hydroxide is, in general 0.5 to 12.0 moles, in particular 0.6 to 6.0 moles, per mole of cellulose (calculated on the basis of an anhydro-D-glucose unit). Alkalization is run in the presence of ammonia and, optionally, an organic solvent.

The proportion of water in the etherifying mixture is advantageously selected as a figure within the range from 5 to 25 moles, per mole of cellulose; or, if the mixture of liquid organic solvent and water is intended to serve as a reference quantity, the proportion of water in the mixture is 3 to 40% by weight. Etherifying agents which are preferably employed are those which effect carboxymethylation or hydroxyethylation i.e., in particular monochloroacetic acid and the salts and esters thereof or ethylene oxide. It is, however, also possible to use other etherifying agents, for example, alkyl chlorides or alkylene oxides, such as propylene oxide. The amount of etherifying agent is usually from 0.05 to 25 moles, in particular from 0.1 to 10 moles, per mole of cellulose. NaCMC prepared according to the process of the present invention has a DS (degree of substitution) which is, in particular, from about 0.3 to 0.8.

In carrying out the preferred embodiment of the process according to the invention in practice, cellulose is first treated with liquid ammonia (allowed to "preswell") for about 3 to 30 minutes, at a temperature in the range from about $-33°$ to $-60°$ C. An aqueous NaOH solution, or water and solid NaOH separately, and, optionally, the organic solvent are then added to this mixture while stirring, in order to carry out alkalization (duration about 10 to 60 minutes) of the activated cellulose and, in the procedure, the temperature of the mixture rises to room temperature; the organic solvent may preferably also be added at a later time, for example, during the removal of the ammonia, particularly after removal of the bulk of the ammonia. Any residue of the activating agent ammonia can be removed by distilling off minor amounts of the organic solvent, preferably under reduced pressure. In the course of the distillation procedure, small amounts of water are also "carried over" in some cases (for example, by azeotropic distillation). The alkalized cellulose is reacted by adding the appropriate etherifying agent(s) and it is then still possible to modify the qualitative and quantitative composition of the water/NaOH/organic solvent(s) system. Subsequently, the crude reaction product is washed until it is, as far as possible, free of salt, and is then dried.

In each case, the reaction mixtures and reaction vessels are, as is known, optionally flushed with inert gases, such as nitrogen, in order to remove oxygen and thus to achieve high viscosities in the reaction products. It is also possible to add so-called antioxidants, such as pyrogallol or gallic acid, in order to prevent reduction in the viscosity (depolymerization). All process steps, in particular those carried out after activation, are, as a rule, operated while stirring well. In the alkalizing step, the process is usually run at room temperature (from $0°$ to $30°$ C., in particular from $15°$ to $30°$ C.), while etherification takes place particularly successfully at a temperature between $30°$ and $120°$ C., in particular at temperatures up to $90°$ C. When carrying out the process without using pressure apparatuses, it is advisable to operate below the boiling temperature of the solvent(s) present in the medium. When, however, a gaseous etherifying agent (such as ethylene oxide or methyl chloride) is employed, operating under normal pressure is not advantageous. The maximum pressure set up in the reaction vessel corresponds to the sum of the partial pressures of the components in the reaction mixture.

The time required in the etherifying step is generally—depending on the reaction temperature—between 30 minutes and 8 hours. The crude product is first freed from the bulk of the liquid components in a separating device (for example, a centrifuge), preferably after adding acid until the unconsumed bases have been neutralized, and it can then, if desired, be subjected to extraction in order to remove adhering salts. Finally, it is dried and, if desired, ground, mixed with further components, or granulated. These methods of working-up, purification, and post-treatment are those which are customary in the chemistry of cellulose ethers and they therefore do not require a detailed description.

The cellulose ethers which can be prepared by the process according to the invention are useful in known fields of technology, for example, as thickeners, adhesives, additives in the field of building materials, additives in the field of foodstuffs, or the like. In comparison with conventional methods for the preparation of cellulose ethers, the process of the present invention is, in particular, distinguished by the fact that a relatively smaller amount of alkali metal hydroxide must be employed in the alkalizing and/or etherifying steps. In spite of this reduction, a rather more uniform etherification over the molecular chain of the polysaccharide cellulose and lower quantities of water-insoluble residues in the end product are likely to result. One of the positive consequences of this small amount of alkali metal hydroxide required is the correspondingly smaller amount of by-products of the reaction, such as salts, hydrolysis products and other degradation products of the reactants. Surprisingly, the reaction products are also improved over those which are prepared from activated cellulose and in the production of which the ammonia is completely removed, before alkalization is carried out. The last-mentioned statement applies, in particular, to the process variant in which an organic solvent, such as an alkanol, is present for at least part of the time during the removal of ammonia; this could not be expected as a matter of course, particularly since the simultaneous action of alkanols and ammonia on cellulose was hitherto considered inappropriate and ineffective for the activation process (see the state of the art mentioned in the introductory part of the specification).

In the examples which follow, parts by weight are related to parts by volume as kg to $dm^3$; percentages relate to weight. "DS" is the degree of substitution, i.e., the average number of substituted OH groups per anhydro-D-glucose unit; in the case of cellulose it is within the range from 0.0 to 3.0. "MS" is the molar degree of substitution, i.e., the average number of moles of the substituting reagent which have been attached by an ether linkage per mole of anhydro-D-glucose unit; in the case of cellulose it can even be greater than 3.0; it is normally used instead of the DS in order to characterize those substituents on the cellulose ether which can be formed by multiple substitution at an OH group, i.e., for example, in the case of the hydroxyalkyl substituent because the resulting OH groups of the hydroxyalkyl groups can also be substituted, like the OH groups of the cellulose itself.

EXAMPLE 1

Six parts by weight of beech pulp are activated (allowed to "pre-swell") in 120 parts by volume of liquid ammonia at a temperature of about $-33°$ C., for 10 minutes. After activation, 3 parts by weight of a 21.7% strength aqueous NaOH solution are added to this mixture, the cellulose is alkalized for about 30 minutes and then 4 parts by volume of water and 120 parts by volume of isopropanol (in the form of the anhydrous product) are added. In the course of these steps, the ammonia is evaporated while stirring and, at the same time, the temperature of the mixture rises to room temperature. By distilling off a few parts by volume of isopropanol under reduced pressure, the ammonia residue still present in the mixture is removed; simultaneously, some water is also removed by azeotropic distillation. The amount of isopropanol which has been distilled off is again added to the reaction mixture. The activated alkali cellulose is etherified by adding 3.45 parts by weight of sodium monochloroacetate, dissolved in 4.8 parts by volume of water, to the suspension medium comprising isopropanol, water, and alkali cellulose; the mixture is heated during 1 hour to 55° C. and maintained at this temperature for 2.5 hours. The crude reaction product is processed in the usual manner. The properties of the end product (NaCMC) are compiled in Table I which follows. The molar ratio of cellulose:etherifying agent:NaOH:$H_2O$ is 1:0.85:0.935:15.

COMPARISON EXAMPLE C1

Example 1 is repeated, however, without the activation step using ammonia, i.e., the pulp is only mixed with the specified quantity of the alkalizing agent, in the presence of isopropanol without specially adding water, while stirring for 30 minutes at room temperature. The organic solvent is not distilled off.

COMPARISON EXAMPLE C2

Example 1 is repeated, except that the ammonia is completely removed before carrying out the alkalizing step and alkalization is run in the presence of isopropanol without specially adding water. The organic solvent is not distilled off.

EXAMPLE 2 AND COMPARISON EXAMPLES C3 AND C4

Example 1 and Comparison Examples C1 and C2 are repeated; in these examples, however, cotton linters are used instead of beech pulp.

EXAMPLE 3 AND COMPARISON EXAMPLES C5 AND C6

Example 1 and Comparison Examples C1 and C2 are repeated, except that in these examples the amount of aqueous NaOH solution is doubled and 2.8 parts by weight of monochloroacetic acid without water content are added as the etherifying agent. The molar proportion of NaOH is thereby increased to 1.87.

TABLE I

| Example | DS | Evaluation of a 2% strength aqueous solution |
|---|---|---|
| 1 | 0.63 | good dissolving character, almost clear solution |
| C1 | 0.66 | many undissolved fibers, turbid solution |
| C2 | 0.64 | undissolved fibers, turbid solution |
| 2 | 0.62 | good dissolving character, clear solution |
| C3 | 0.63 | many undissolved fibers, very turbid solution |
| C4 | 0.63 | undissolved fibers, turbid solution |
| 3 | 0.63 | good dissolving character, almost clear solution |
| C5 | 0.63 | slight turbidity |
| C6 | 0.68 | hardly any turbidity |

EXAMPLE 4 AND COMPARISON EXAMPLES C7 AND C8

Example 1 and Comparison Examples C1 and C2 are repeated, except that alkalization is carried out using 3.06 parts by weight of a 30% strength aqueous NaOH solution and without specially adding water. For the etherification, 2.43 parts by weight of sodium monochloroacetate in 7.3 parts by volume of water are used. The properties of the end products (NaCMC) are specified in Table II. The molar proportions of etherifying agent and NaOH, respectively, are reduced to 0.6 and 0.66, respectively.

EXAMPLE 5 AND COMPARISON EXAMPLES C9 AND C10

Example 1 and Comparison Examples C1 and C2 are repeated, except that alkalization is carried out using 11.1 parts by weight of a 15.7% strength aqueous NaOH solution. As the etherifying agent, 1.97 parts by weight of monochloroacetic acid are used. The molar proportions of etherifying agent and NaOH change to 0.6 and 1.26, respectively.

TABLE II

| Example | DS | Residue upon dissolving, determined on an 0.5% strength aqueous solution in % |
|---|---|---|
| 4 | 0.40 | 5 |
| C7 | 0.39 | 54 |
| C8 | 0.39 | 18 |
| 5 | 0.40 | 1 |
| C9 | 0.39 | 11 |
| C10 | 0.39 | 10 |

EXAMPLE 6 AND COMPARISON EXAMPLES C11 AND C12

Example 1 and Comparison Examples C1 and C2 are repeated, except that in these examples, 8.66 parts by weight of a 13.7% strength aqueous NaOH solution are employed. As the etherifying agent, 6.9 parts by weight of ethylene oxide are used and etherification is run for 2 hours at 30° C. and for 4 hours at 70° C. while stirring, in a reaction vessel equipped with a brine-cooled reflux condenser. Table III lists the properties of the end product (HEC). The molar ratio cellulose:etherifying agent:NaOH:H$_2$O is 1:4.5:0.85:11.9.

EXAMPLE 7 AND COMPARISON EXAMPLE C13

Example 6 and Comparison Example C11 (i.e., without pre-activation) are repeated using, however, cotton linters instead of beech pulp.

TABLE III

| Example | MS | Evaluation of a 2% strength aqueous solution |
|---|---|---|
| 6 | 2.80 | good dissolving character, clear solution |
| C11 | 2.44 | undissolved constituents, turbid solution |
| C12 | 2.51 | turbid solution |
| 7 | 2.55 | good dissolving character, clear solution |
| C13 | 2.05 | undissolved constituents, turbid solution |

What is claimed is:

1. A process for the preparation of water-soluble cellulose ethers, comprising the steps of:
   (a) activating cellulose with ammonia;
   (b) alkalizing the activated cellulose with an alkalizing agent in the presence of ammonia, said alkalizing agent comprising an aqueous solution of an alkali metal hydroxide;
   (c) removing the ammonia from the alkali cellulose in the presence of the alkalizing agent; and
   (d) etherifying the alkali cellulose with an etherifying agent in the presence of an organic solvent.

2. A process according to claim 1, wherein said organic solvent is present during step (b).

3. A process according to claim 1, further comprising the adding of said organic solvent during removal of said ammonia from said alkali cellulose.

4. A process according to claim 3, wherein said organic solvent is added after removal of the bulk of said ammonia.

5. A process according to claim 1, wherein said organic solvent comprises an alkanol having from 1 to 6 carbon atoms.

6. A process according to claim 1, wherein said activation of the cellulose is carried out using liquid ammonia.

7. A process according to claim 6, wherein said activating step is carried out at a temperature ranging from about −33° to −60° C.

8. A process according to claim 1, wherein said etherifying comprises carboxymethylation or hydroxyethylation.

9. A process according to claim 8, wherein said etherifying agent is selected from the group consisting of monochloroacetic acid, salts and esters thereof, and ethylene oxide.

10. A process according to claim 8, wherein said carboxymethylation results in a sodium carboxymethyl cellulose having a DS from 0.3 to 0.8.

11. A process according to claim 1, wherein an aqueous NaOH solution is used as said alkalizing agent.

12. A process according to claim 1, wherein the amount of said alkali metal hydroxide used in step (b) is in the range of 0.6 to 6.0 moles per mole of cellulose.

13. A process according to claim 1, wherein the amount of said etherifying agent used in step (d) is in the range of 0.1 to 10 moles per mole of cellulose.

14. A process according to claim 1, wherein step (b) is run at a temperature between about 15° and 30° C., and step (d) is run at a temperature ranging from about 30° C. up to 90° C.

15. A process according to claim 1, wherein step (b) is carried out in the presence of an excess of water.

* * * * *